US011323550B2

(12) United States Patent
Ali et al.

(10) Patent No.: US 11,323,550 B2
(45) Date of Patent: May 3, 2022

(54) TECHNIQUES TO SEND LOAD-SHARE NOTIFICATIONS TO MULTIPLE RECEIVERS

(71) Applicant: Cisco Technology, Inc., San Jose, CA (US)

(72) Inventors: Irfan Ali, Palo Alto, CA (US); Subrata Mukherjee, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/881,200

(22) Filed: May 22, 2020

(65) Prior Publication Data

US 2021/0258406 A1 Aug. 19, 2021

Related U.S. Application Data

(60) Provisional application No. 62/977,459, filed on Feb. 17, 2020.

(51) Int. Cl.
*H04L 29/06* (2006.01)
*H04W 8/20* (2009.01)
(Continued)

(52) U.S. Cl.
CPC .............. *H04L 69/22* (2013.01); *H04W 8/20* (2013.01); *H04W 60/005* (2013.01);
(Continued)

(58) Field of Classification Search
CPC ......... H04L 69/22; H04L 67/02; H04L 67/16; H04L 67/26; H04W 8/20; H04W 60/005; H04W 60/04; H04W 68/005; H04W 76/11

See application file for complete search history.

(56) References Cited

U.S. PATENT DOCUMENTS 6,934,752 B1 * 8/2005 Gubbi ............... H04L 29/06027
370/392
8,054,780 B1 * 11/2011 Manroa ................... H04L 67/26
370/328

(Continued)

FOREIGN PATENT DOCUMENTS

WO   2018104769 A1   6/2018
WO   2019101340 A1   5/2019

(Continued)

OTHER PUBLICATIONS

3GPP, 3rd Generation Partnership Project; Technical Specification Group Core Network and Terminals; 5G System; Network Function Repository Services; Stage 3 (Release 16), 3GPP TS 29.510 V16.2.0 (Dec. 2019), 167 pages.

(Continued)

*Primary Examiner* — Eunsook Choi
(74) *Attorney, Agent, or Firm* — Edell, Shapiro & Finnan, LLC

(57) ABSTRACT

Presented herein are techniques to facilitate that enable notifications to be sent to multiple consumers for Third Generation Partnership Project (3GPP) architectures. In one example, a method is provided that may include obtaining, at a first network entity, a notification subscription message from a second network entity, the notification subscription message comprising a plurality of notification identifiers associated with the second network entity for notifications that are to be communicated to the second network entity, wherein the plurality of notification identifiers are indicated, at least in part, in a header of the notification subscription message; and communicating one or more notifications to the second network entity, wherein the one or more notifications are load-shared among the plurality of notification identifiers associated with the second network entity.

20 Claims, 9 Drawing Sheets

(51) Int. Cl.
  *H04L 69/22*     (2022.01)
  *H04W 76/11*    (2018.01)
  *H04W 68/00*    (2009.01)
  *H04W 60/04*    (2009.01)
  *H04W 60/00*    (2009.01)

(52) U.S. Cl.
  CPC ......... *H04W 60/04* (2013.01); *H04W 68/005* (2013.01); *H04W 76/11* (2018.02)

(56) References Cited

U.S. PATENT DOCUMENTS

| | | | |
|---|---|---|---|
| 2019/0116486 A1 | 4/2019 | Kim et al. | |
| 2019/0191467 A1* | 6/2019 | Dao | H04W 76/10 |
| 2019/0215724 A1 | 7/2019 | Talebi Fard et al. | |
| 2019/0230556 A1 | 7/2019 | Lee | |
| 2019/0261260 A1* | 8/2019 | Dao | H04W 48/18 |
| 2020/0008184 A1 | 1/2020 | Lee et al. | |
| 2020/0028920 A1* | 1/2020 | Livanos | H04W 8/26 |
| 2020/0099703 A1 | 3/2020 | Singh | |
| 2020/0127916 A1 | 4/2020 | Krishan | |
| 2020/0128503 A1 | 4/2020 | Li et al. | |
| 2020/0396649 A1* | 12/2020 | Zong | H04W 48/08 |
| 2021/0120596 A1* | 4/2021 | Youn | H04W 8/08 |
| 2021/0168079 A1* | 6/2021 | Yu | H04W 28/0804 |

FOREIGN PATENT DOCUMENTS

| | | |
|---|---|---|
| WO | 2019221646 A1 | 11/2019 |
| WO | 2020027713 A1 | 2/2020 |
| WO | 2020039348 A2 | 2/2020 |

OTHER PUBLICATIONS

3GPP, 3rd Generation Partnership Project; Technical Specification Group Core Network and Terminals; 5G System; Access and Mobility Management Services; Stage 3 (Release 16), 3GPP TS 29.518 V16.2.0 (Dec. 2019), 226 pages.

E. Voit et al., "Custom Subscription to Event Notifications draft-eitf-netconf-subscribed-notifications-05", NETCONF, Oct. 2, 2017, 33 pages.

3GPP, 3rd Generation Partnership Project; Technical Specification Group Services and System Aspects; Telecommunication management; Charging management; 5G system; Services, operations and procedures of charging using Service Based Interface (SBI) (Release 16), 3GPP TS 32.290 V16.3.0 (Dec. 2019), 34 pages.

3GPP, 3rd Generation Partnership Project; Technical Specification Group Core Network and Terminals; 5G System; Session Management Policy Control Service; Stage 3 (Release 16), 3GPP TS 29.512 V16.3.0 (Dec. 2019), 178 pages.

3GPP, 3rd Generation Partnership Project; Technical Specification Group Core Network and Terminals; 5G System Session Management Event Exposure Service; Stage 3 (Release 16), 3GPP TS 29.508 V16.2.0 (Dec. 2019), 41 pages.

3GPP, 3rd Generation Partnership Project; Technical Specification Group Core Network and Terminals; 5G System; Session Management Services; Stage 3 (Release 16), 3GPP TS 29.502 V16.2.0 (Dec. 2019), 211 pages.

3GPP, "3rd Generation Partnership Project; Technical Specification Group Core Network and Terminals; 5G System; Technical Realization of Service Based Architecture; Stage 3 (Release 16)", 3GPP TS 29.500 V16.3.0 (Mar. 2020), 65 pages.

3GPP, 3rd Generation Partnership Project; Technical Specification Group Services and System Aspects; System Architecture for the 5G System; Stage 2 (Release 15), 3GPP TS 23.501 V15.3.0 (Sep. 2018), 226 pages.

Cisco Systems, "Bindings for Notifications", 3GPP TSG-SA/WG2 Meeting #137E, S2-2002135, Feb. 24-28, 2020, 6 pages.

Cisco Systems, "Binding for notifications", 3GPP TSG SA WG2 Meeting #137-E, S2-2002136, Feb. 24-27, 2020, 4 pages.

Cisco Systems, "Binding for notifications", 3GPP TSG SA WG2 Meeting #137-E, S2-2002138, Feb. 24-28, 2020, 3 pages.

Oracle, "Oracle Communications Cloud Native Core Solution", Version 2.0, retrieved from Internet Aug. 2020, 7 pages.

3GPP, "3rd Generation Partnership Project; Technical Specification Group Core Network and Terminals; 5G System; Technical Realization of Service Based Architecture; Stage 3 (Release 16)", 3GPP TS 29.500 V16.4.0, Jun. 2020, 79 pages.

R. Fielding, Ed. et al., "Hypertext Transfer Protocol (HTTP/1.1): Message Syntax and Routing", Internet Engineering Task Force (IETF), ISSN: 2070-1721, Jun. 2014, 89 pages.

Oracle, "Service Communication Proxy (SCP) Cloud Native User's Guide", Release 1.1, Jul. 2019, 82 pages.

3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.

D. Benjamin, "RFC 8740 Using TLS 1.3 with HTTP/2," Internet Engineering Task Force (IETF), RFC: 8740, Updates: 7540, Category: Standards Track, ISSN: 2070-1721, Feb. 2020, 5 pages.

M. Belshe, et al., "Hypertext Transfer Protocol Version 2 (HTTP/2)," Internet Engineering Task Force (IETF), Request tor Comments: 7540, Category: Standards Track, ISSN: 2070-1721, May 2015, 96 pages.

* cited by examiner

US 11,323,550 B2

TECHNIQUES TO SEND LOAD-SHARE NOTIFICATIONS TO MULTIPLE RECEIVERS

CROSS-REFERENCE TO RELATED APPLICATION

This application claims the benefit of priority under 35 U.S.C. § 119 to U.S. Provisional Patent Application Ser. No. 62/977,459, entitled "TECHNIQUES TO SEND LOAD-SHARE NOTIFICATIONS TO MULTIPLE RECEIVERS," filed on Feb. 17, 2020, the disclosure of which application is hereby incorporated by reference in its entirety.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases and as access network resources are shared among multiple service providers, efficient management of communication resources becomes more critical. In particular, there are significant challenges in managing event notifications for a subscriber that involve communicating event notifications to multiple destinations.

DESCRIPTION OF EXAMPLE EMBODIMENTS

Overview

The Third (3rd) Generation Partnership Project (3GPP) Release 16 (Rel-16) enhanced Service Based Architecture (eSBA) is introducing mechanisms in which user equipment (UE) context can be shared between multiple instances of a service and has introduced schemes that enable consumers to load-share their requests to multiple producers. However, this scheme cannot be applied to event notification involving notifications sent from a given producer to a consumer that can receive notifications via multiple notification identifiers. It is possible that event notifications (both explicit and implicit) may account for more than 50% of all service calls in a 5G core (5GC) network.

Techniques presented herein provide a scheme that enables notifications to be sent to multiple consumers, hence making the eSBA applicable to all services of 5GC as well as providing an important feature for 5G architectures. In at least one example embodiment, a method is provided that may include obtaining, at a first network entity, a notification subscription message from a second network entity, the notification subscription message comprising a plurality of notification identifiers associated with the second network entity for notifications that are to be communicated to the second network entity, wherein the plurality of notification identifiers are indicated, at least in part, in a header of the notification subscription message; and communicating one or more notifications to the second network entity, wherein the one or more notifications are load-shared among the plurality of notification identifiers associated with the second network entity.

In another example embodiment, a method is provided that may include obtaining, at a first network entity, a notification subscription message from a second network entity, wherein the notification subscription message comprises network function set information and binding level information, and wherein the network function set information comprises a plurality of notification identifiers for one or more notifications to be communicated; and communicating one or more notifications using the plurality of notification identifiers, wherein the one or more notifications are load-shared among the plurality of notification identifiers based on the binding level information.

Example Embodiments

Figure 1:
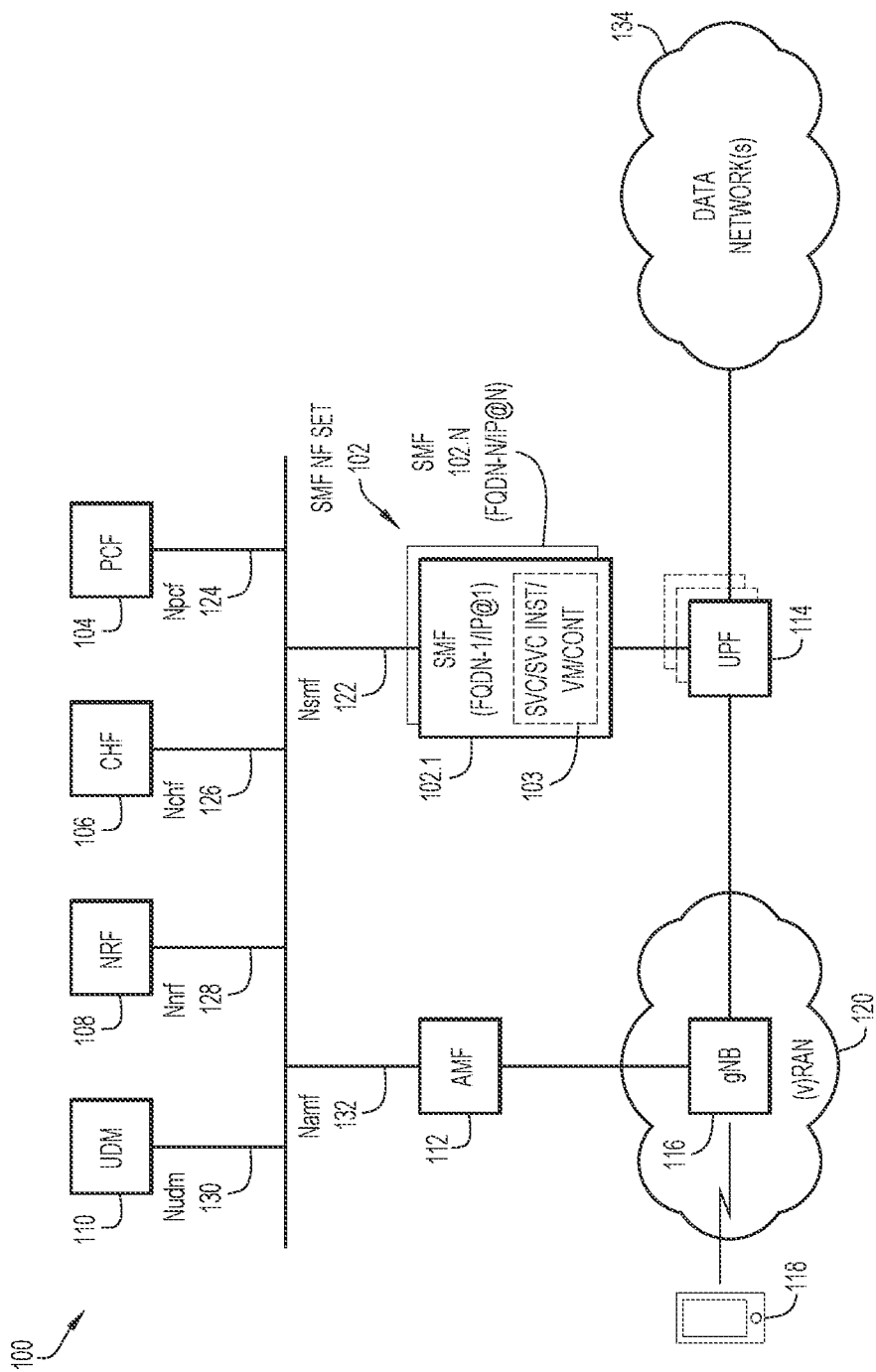
FIG. 1 is a diagram of a system in which techniques may be implemented to facilitate sending load-share notifications to multiple receivers, according to an example embodiment.

Referring to FIG. 1, FIG. 1 is a diagram of a system 100 in which techniques may be implemented to facilitate sending load-share notifications to multiple receivers, according to an example embodiment. In at least one embodiment, system 100 may be representative of an eSBA for a Third (3rd) Generation Partnership Project (3GPP) Fifth (5th) Generation System (5GS) or 5GC network.

System 100 may include an 'N' number of Session Management Functions (SMFs) 102.1-102.N, which may, collectively, provide an SMF Network Function (NF) set 102. In some instances, an SMF, such as SMF 102.1 may be configured with any number and/or combination of services (SVC), service instances (SVC INST), virtual machines (VM), and/or containers (CONT) 103 operating thereon that may be configured/organized into any sets or groups.

System 100 may also include a Policy Control Function (PCF) 104, a Charging Function (CHF) 106, a Network Repository Function (NRF) 108, a Unified Data Management (UDM) entity 110, an Access and Mobility Management Function (AMF) 112, a User Plane Function (UPF) 114, and a next generation Node B (gNB) 116. The gNB 116 may facilitate (e.g., via hardware (processors, transceivers/modems, antenna, etc.), software, logic, etc.) a 3GPP 5G Radio Access Network (RAN), which may be inclusive of any combination of a virtualized or non-virtualized RAN (v)RAN 120. Also shown in system 100 is a user equipment (UE) 118 and one or more data network(s) 134 (e.g., the Internet, an Enterprise network, combinations thereof, etc.).

For the embodiment of FIG. 1, gNB 116 may interface with UPF 114 and AMF 112 in which UPF 114 may further interface with data network(s) 134 and SMF 102.1 and data network(s) 134. In some instances, one or more additional UPF(s) 114 may be provided in system 100 in which any combination of SMFs 102.1-102.N may interface with any combinations or groups of UPFs 114. Generally for the 5GS/5GC network of system 100, SMF 102.1-102.N, PCF 104, CHF 106, NRF 108, UDM 110, and AMF 112 are considered control plane elements, while UPF(s) 114 are considered user plane elements, in which a user data plane is facilitated via communications between gNB 116, UPF(s) 114, and data network(s) 134 for user data plane communications between UE 118 and data network(s) 134.

For a 5GS/5GC network as shown in FIG. 1, an SMF, such as any of SMF 102.1-102.N is typically responsible for UE Protocol Data Unit (PDU) Session Management (SM), with individual functions being supported on a per-session basis, and also for selection and control of a UPF (e.g., any of UPF(s) 114) to facilitate data transfer(s) between UE(s) the data network(s) 134. Typically, the PCF 104 stores policy data for the system 100 to provide policy control services (e.g., to facilitate access control, network selection, etc.; to provide session related policies/policy updates to NF consumers (e.g., SMF 102.1, etc.); and/or to provide background data transfer policies to NF consumers) and/or to provide policy authorization services (e.g., to allow an NF consumer (e.g., SMF 102.1, etc.) to subscribe/unsubscribe to various UE PDU session/event notifications). Various session related policies/policy updates are prescribed by 3GPP Technical Specification (TS) 29.512 and may include, but not be limited to, PCF initiated updates of policies associated with a PDU session, PCF initiated deletion of an SM Policy Association, provisioning of Policy and Charging Control (PCC) rules, etc. Various UE PDU session notifications are prescribed in 3GPP TS 23.508, and may include, but not be limited to, UE access type change notifications, UE path changes, usage reports, Public Land Mobile Network (PLMN) changes, PDU session release, UE Internet Protocol (IP) address changes, etc.

Typically, the CHF 106 provides support for charging services such as facilitating the transfer of policy counter information associated with subscriber (e.g., UE) spending limits, etc. Typically, the NRF 108 provides support for NF management (e.g., registering, deregistering, updating services to NFs/NF services), NF discovery (e.g., enabling NF service consumer(s) to discover a set of NF instances with a specific NF service/NF type and/or to discover a specific NF service), and NF access (e.g., NF authorization). Typically, the UDM 110 stores subscription data for subscribers (e.g., UE 118) that can be retrieved and/or otherwise obtained/utilized by a NF consumer. PCF 104, NRF 108, and/or SMFs 102.1-102.N may facilitate other operations in accordance with embodiments herein, discussed below.

The AMF 112 typically provides access authentication services, authorization services, and mobility management control for one or more UE, such as UE 118. In various embodiments, a UE, such as UE 118, may be associated with any user, subscriber, employee, client, customer, electronic device, etc. wishing to initiate a flow in system 100 and may be inclusive of any device that initiates a communication in system 100, such as a computer, an electronic device such as a parking meter, vending machine, industrial device, automation device, enterprise device, appliance, Internet of Things (IoT) device, etc., a laptop or electronic notebook, a cellular/Wi-Fi enabled telephone/smart phone, tablet, etc. and/or any other device, component, element, or object capable of initiating voice, audio, video, media, or data exchanges within system 100 (e.g., via one or more data network(s) 134).

For the eSBA of FIG. 1, various service-based interfaces may facilitate communications between/among various elements, such as AMF 112, UDM 110, NRF 108, CHF 106, PCF 104, and SMFs 102.1-102.N. For example, services corresponding to SMF 102.1-102.N may be accessed by other element(s) via corresponding service-based interface Nsmf 122, PCF 104 services may be accessed by other element(s) via a service-based interface Npcf 124, CHF 106 services may be accessed by other element(s) via a service-based interface Nchf 126, NRF 108 services may be accessed by other element(s) via a service-based interface Nnrf 128, UDM 110 services may be accessed by other element(s) via a service-based interface Nudm 130, and AMF 112 services may be accessed by other element(s) via a service-based interface Namf 132.

In 3GPP 5G systems that involve event notifications, a subscriber or consumer can send an implicit or explicit subscription message to a producer of an event. Utilizing the Hypertext Transfer Protocol (HTTP) and/or HTTP/2.0 (HTTP/2) protocol, the consumer can provide a Uniform Resource Identifier (URI), often referred to as a "callback URI" to which a producer can send notification(s) utilizing the HTTP and/or HTTP/2 protocol. A callback URI typically includes the IP address, port information, or the Fully Qualified Domain Name (FQDN). For example, SMF 602.1 can be configured with an FQDN-1 and/or an IP address-1 (IP@1) and SMF 602.N can be configured with an FQDN-N and/or an IP@N.

To handle failure scenarios according to current 3GPP specifications, there is a possibility that a consumer can provide a primary IP address and one or more alternate backup IP addresses to which a producer can send event notifications in case the primary endpoint fails. However, current 3GPP specifications do not allow for sending notifications to multiple 'active' destinations.

In 3GPP Rel-16 eSBA, there is the possibility of sharing context between multiple services/NFs (e.g., SMFs 102.1-102.N) such that once context is updated/changed for a particular service/NF other services/NFs may obtain the updated/changed context (e.g., by accessing and/or otherwise obtaining context stored by the particular service/NF, which may be internal or external to the service/NF (e.g., a database for storing context internal and/or external to services/NFs). Hence, multiple consumer instances can handle notifications being provided by a given producer. Thus, if one consumer/consumer instance is more loaded than the other is, it could be advantageous for a producer to send notifications to a less loaded consumer/consumer instance. However, such load-sharing based notifications are not currently supported in 3GPP specifications.

Also, Rel-16 eSBA introduces a proxy referred to as a Service Communication Proxy (SCP), which can exist between a producer and a consumer. For instances in which an SCP is implemented, the SCP can be informed about the possibility of load-sharing, if allowed, to load-share notifications across multiple consumers.

One goal of the techniques presented herein is to include one or more 'active' alternative IP address(es), IP address(es):port(s), or FQDN(s), in the body of a notification subscription message (implicit or explicit) in which a callback URI is provided such that notifications can be load-shared among a primary IP address, IP address:port, or FQDN and one or more alternate 'active' IP address(es), IP address(es):port(s), or FQDN(s), in the body of a notification subscription message. For an explicit subscription, an NF consumer (e.g., SMF 102.1) can explicitly subscribe to an NF producer (e.g., PCF 104) for notifications. For an implicit subscription, a NF consumer registers with the NRF 108. When a NF producer discovers the NF consumer, it does so for notification purposes. Thus, the NF consumer is not explicitly subscribing to notifications from the producer but rather implicitly via the NRF. Although various examples herein are discussed with reference explicit subscriptions via an HTTP/2 POST, it is to be understood that features of the techniques presented herein can be equally implemented for implicit subscription scenarios.

Broadly, any of a primary IP address (IP@), IP@:port, or FQDN and one or more active alternative IP@(s), IP@(s):port(s), or FQDN(s) as discussed for various can be referred to herein as 'notification identifiers' that can be used to identify any number of consumers/consumer instances (e.g., SMFs 102.1-102.N, NF instances, NF service sets, etc.) to which one or more load-share notifications can be sent from an event notification producer (e.g., PCF 104). Embodiments herein may provide for the ability to provide load-share notifications (e.g., sending notifications to a less-loaded consumer/consumer instances) and/or provide load-balanced notifications (e.g., providing notifications across multiple consumers/consumer instances in order to equalize load across the consumers/consumer instances). Although various examples herein are discussed with reference to load-sharing, it is to be understood that features of the techniques presented herein can be equally implemented for load-balancing scenarios.

As referred to herein, the term 'active' is meant to indicate that a producer can send notifications to any of a primary and/or any number of alternative notification identifiers (e.g., address(es), address(es):ports(s), or FQDN(s)). Such usage of 'active' alternative notification identifiers can be distinguished from current 3GPP implementations that may involve a primary address and alternate backup addresses as used in existing information elements (IEs) for subscription services.

Thus, the 3GPP prescribed alternate backup addresses are not active addresses (broadly, notification identifiers) to which notifications can be sent at any time but rather addresses to which notifications can be sent only in the event that a notification sent to a primary address fails. In contrast, embodiments herein provide that notifications can be sent at any time to any combination of a primary and active alternative notification identifiers (e.g., address(es), address(es):port(s), or FQDN(s)).

Figure 2:
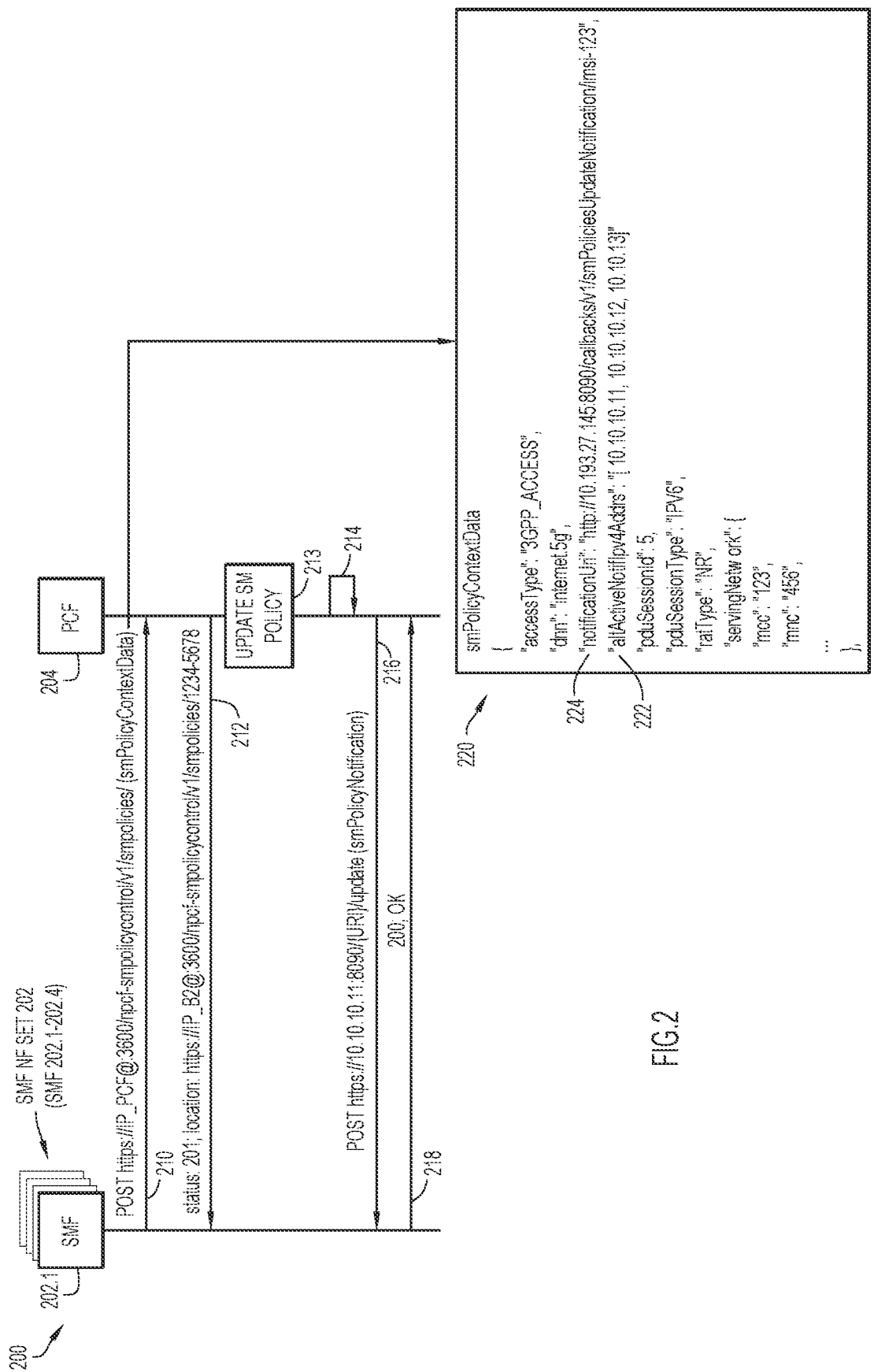
FIG. 2 is a message sequence diagram illustrating a call flow associated with sending load-share notifications to multiple receivers, according to an example embodiment.

Referring to FIG. 2, FIG. 2 is a message sequence diagram illustrating a call flow 200 associated with sending load-share notifications to multiple receivers, according to an example embodiment. FIG. 2 includes a number of SMFs 202.1-202.4 for an SMF NF set 202 and also a PCF 204.

Consider, as shown in FIG. 2, that SMF 202.1, at 210, seeks to create a Session Management (SM) policy with the PCF 204 by communicating a notification subscription request to PCF 204 via a HTTP/2 POST message that includes a notification URI header field 224 of "http://10.193.27.145:8090/callbacks/v1/smPoliciesUpdateNotification/imsi-123" (in which the IP address of the SMF 202.1 is 10.193.27.145 in this example) within a 3GPP smPolicyContextData data type structure 220 for creating an SM Policy Context resource by the PCF 204.

For the embodiment of FIG. 2, the 3GPP 'smPolicyContextData' data structure 220 can be enhanced to include a new header extension or field, shown in FIG. 2 as a 'altActiveNotifIpv4Addrs' header field 222, that may include one or more of active alternate notification identifiers (e.g., IP address(es) (IP@s), such as IP version 4 (IPv4) or IP version 6 (IPv6) addresses, IP@(s) and port(s) (IP@:port(s)), or FQDN(s), depending on implementation).

As shown in the example of FIG. 2, the new 'altActiveNotifIpv4Addrs' header field 222 identifies three active alternative IPv4 addresses: 10.10.10.11 (corresponding to SMF 202.2 in this example example), 10.10.10.12 (corresponding to SMF 202.3 in this example), and 10.10.10.13 (corresponding to SMF 202.4 in this example) to which event notifications may also be sent. At 212, PCF 204 responds with a HTTP/2 '201 created' response to confirm that the SM Policy Context was successfully created includes a location header field containing the URI of the created SM Policy Context.

Although the embodiment of FIG. 2 illustrates example details for notification identifiers associated with each of multiple NF instances (e.g., SMFs 202.1-202.4), a particular NF/NF instance could have multiple notification identifiers associated therewith. For example, a single NF/NF instance could include different services/service instances, different virtual machines, different containers, and/or the like operating on the single NF/NF instance; each of which and/or groups/sets of which different services/service instances/virtual machines/containers/etc. could be associated with different notification identifiers. Thus, it is to be understood that the load-share notifications discussed for the embodiment of FIG. 2 can be equally applied to implementations in which multiple notification identifiers may be associated with a single NF/NF instance.

For the embodiment of FIG. 2, the PCF 204 can load-share event notifications among consumers/consumer instances using the notification identifiers such as the (primary) address identified in the notification URI header field 224 (e.g., IP address 10.193.27.145 for SMF 202.1) and the active alternative address(es) in the 'altActiveNotifIPv4Addrs' header field 222 (10.10.10.11, 10.10.10.12, 10.10.10.13). Subsequently, for example, when the PCF 204 determines an event notification, such as for an SM policy update as shown at 213, the PCF 204 can select, as shown at 214, a notification identifier from the primary and active alternative IP@s (or IP@s:ports or FQDNs, as applicable) to which to send the event notification in order to load-share the event notification across any of the consumers/consumer instances (e.g., any of SMF 202.1-202.4).

In one example, PCF 204 may load-share event notifications across the primary and active alternative notification identifiers by selecting a notification identifier to which to send a given notification in a round-robin manner. In another embodiment, PCF 204 can query an NRF (e.g., NRF 108, as shown in FIG. 1) to determine loading information among the SMFs 202.1-202.4 to determine a less-loaded SMF and corresponding notification identifier for the SMF to which to send a given event notification. Other variations can be envisioned in order to facilitate load-sharing notifications across multiple consumers/consumer instances.

Upon selecting a corresponding notification identifier for a given consumer/consumer instance to which the send the event notification, the PCF 204 can send a POST (as shown at 216) using the selected notification identifier in which the POST includes an 'smPolicyNotification' data structure (e.g., as prescribed by 3GPP TS 29.512) that identifies one or more SM policy updates for the SMF NF set 202. For the present example, consider that PCF 204 selects (at 214) to send the event notification at 216 to SMF 202.2 at IP@:port 10.10.10.11:8090, which may store the SM policy updates. At 218, SMF 202.2 responds with a "200; OK" response indicating a successful update to the SM policy. In some embodiments, the response may include an updated or modified list of active alternative notification identifiers (IP@(s), IP@:port(s), or FQDN(s)). The information contained in the notification (e.g., SM policy updates) can be shared with the other SMFs 202.1, 202.3, and 202.4 (e.g., the other SMFs can access the SM policy updates stored by SMF 202.2) to maintain the same context across the SMF NF set 202.

Figure 4:
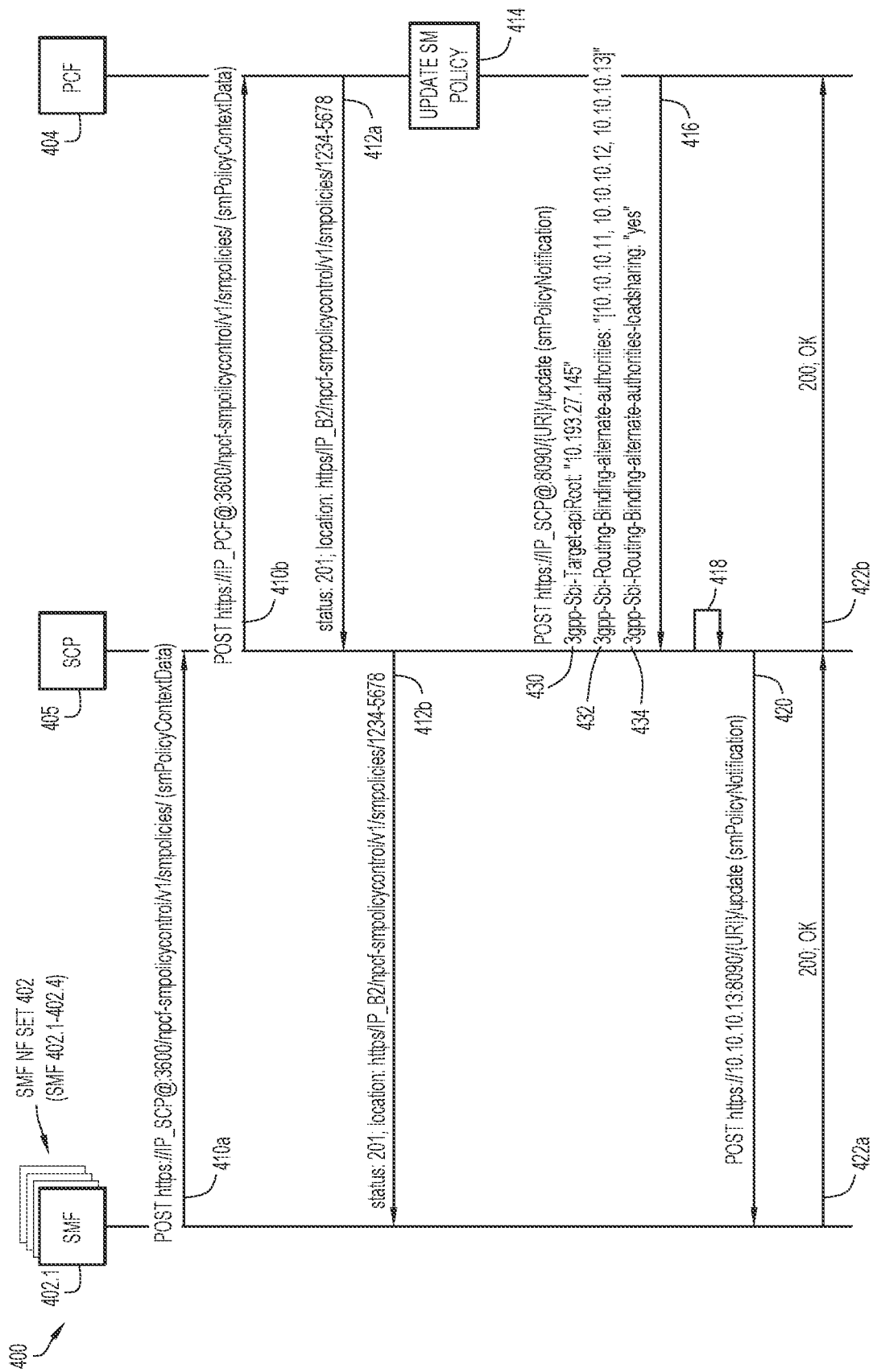
FIG. 4 is a message sequence diagram illustrating yet another call flow associated with sending load-share notifications to multiple receivers, according to an example embodiment.

In some embodiments, an SCP may be implemented to perform load-sharing instead of a notification producer (e.g., PCF 204). For such embodiments, a new HTTP/2 header '3gpp-Sbi-Routing-Binding-alternate-authorities' can be included in the POST sent by the notification producer (e.g., PCF 204) that contains the alternative notification identifiers (e.g., IP@s, IP@s:ports, or FQDN(s), as may be applicable). The POST also includes an HTTP/2 header '3gpp-Sbi-Target-apiRoot' as prescribed by 3GPP specifications that identifies the (primary) notification identifier (IP@/port/FQDN) of the consumer that requested the subscription (e.g., IPv4 address 10.193.27.145 for SMF 202.1 in the present example). For embodiments in which an SCP is implemented, the SCP can send load-share notifications across any of the primary notification identifier and active alternative notification identifiers (e.g., IP@s/ports/FQDNs, as applicable) based on loading information (e.g., obtained from the NRF), in a round-robin manner, etc. FIG. 4, below illustrates example details associated with one example SCP implementation.

It is to be understood that the names of various new headers/header fields discussed herein are provided for illustrative purposes only and are not meant to limit the broad scope of the present disclosure. Any names may be utilized for headers/header fields discussed herein and, thus, are clearly within the scope of the present disclosure.

It is also to be understood that IP addresses described herein are provided for example purposes only and are not meant to limit the broad scope of the teachings of the present disclosure. Further, although examples herein may be illustrated from the perspective of IPv4 addresses, it is to be understood that IPv6 addresses or FQDNs can be expressed in a similar manner (e.g., utilizing a new field 'altActiveNotifIpv6Addrs' for IPv6 addresses, a new field 'altActiveNotifFqdns' for FQDNs, or any variations thereof). Additionally, it is to be understood that the names of new various IP or FQDN fields discussed herein are provided for illustrative purposes only and are not meant to limit the broad scope of the present disclosure. Any names may be utilized and, thus, are clearly within the scope of the present disclosure.

In some embodiments, techniques provided herein can also be applied to the DefaultNotificationCallback URIs for an AMF (e.g., AMF 112 as shown in FIG. 1), a CHF (e.g., CHF 106 as shown in FIG. 1, and/or a UDM entity (e.g., UDM 110 as shown in FIG. 1), each of which can be stored in a NRF (e.g., NRF 108 as shown in FIG. 1).

Further, although examples herein are discussed with reference to creating a subscription, it is to be understood that similar techniques can also be utilized for modifying an existing subscription through similar enhancements (e.g., utilizing a new 'altActiveNotifIpv4Addrs' header field, etc.) that can be provided for HTTP PUT messages.

Figure 3:
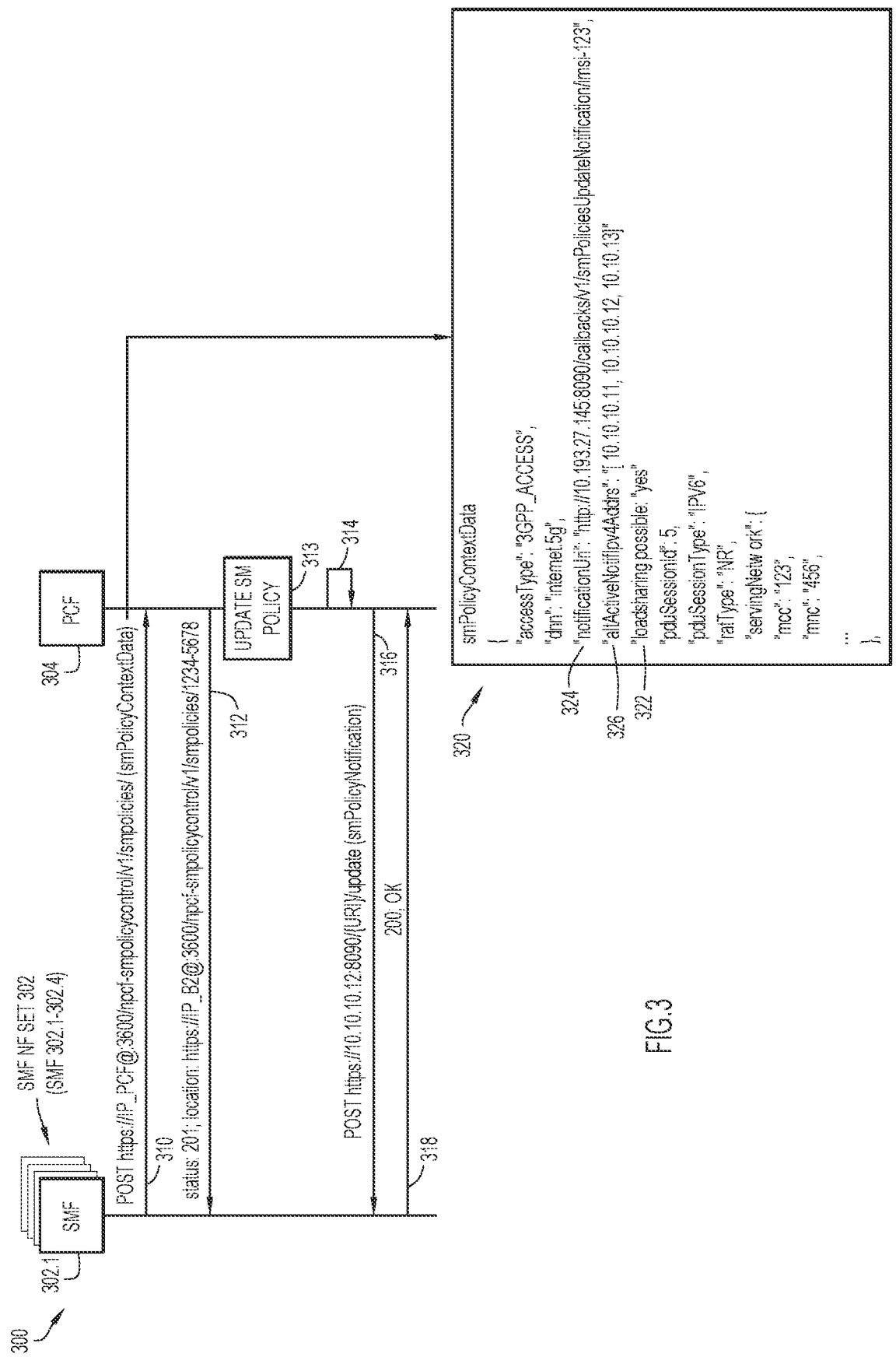
FIG. 3 is a message sequence diagram illustrating another call flow associated with sending load-share notifications to multiple receivers, according to an example embodiment.

Referring to FIG. 3, FIG. 3 is a message sequence diagram illustrating another call flow 300 associated with sending load-share notifications to multiple receivers, according to an example embodiment. In particular, call flow 300 illustrates another technique in which load-share notifications can be facilitated through enhancing the smPolicyContextData data structure to include new HTTP header carrying a new load-sharing flag that can be used to indicate whether alternative notification identifiers are to be used in an 'active' manner for sending load-share notifications. FIG. 3 includes a number of SMFs 302.1-302.4 for an SMF NF set 302 and also a PCF 304.

For the technique illustrated in FIG. 3, when a consumer, such as SMF 302.1, creates a subscription, it can provide alternate notification identifiers, such as IP address(es), IP address(es):port(s), or FQDN(s) (also referred to as an "authority" field of the URI), as currently specified in 3GPP TS 29.508. In addition, the subscription message can be enhanced beyond the current 3GPP specifications such that consumer can also provide a new load-sharing flag to indicate that event notifications can be load-shared among any of the primary notification identifier (for the consumer creating the subscription) and the alternative notification identifiers For the embodiment of FIG. 3, when the flag is set, it indicates that the alternative notification identifiers can be used in an 'active' manner for sending load-share notifications. However, when the flag is unset or not present, the alternative notification identifiers are to be used in a 'backup' manner as per current 3GPP specifications (e.g., only when a failure occurs for the primary identifier).

Similarly, as noted for above for the embodiment of FIG. 2, although the embodiment of FIG. 3 illustrates example details for notification identifiers associated with each of multiple NFs (e.g., SMFs 302.1-302.4), a particular NF/NF instance could have multiple notification identifiers associated therewith. For example, a single NF/NF instance could include different services/service instances, different virtual machines, different containers, and/or the like operating on the single NF/NF instance; each of which and/or groups/sets of which different services/service instances/virtual machines/containers/etc. could be associated with different notification identifiers. Thus, it is to be understood that the load-share notifications discussed for the embodiment of FIG. 3 can be equally applied to implementations in which multiple notification identifiers may be associated with a single NF/NF instance.

Consider as shown in FIG. 3 that SMF 302.1, at 310, seeks to create an SM policy with PCF 304 by including a subscription notification request to PCF 304 via a HTTP/2 POST message including a 'smPolicyContextData' data structure 320 that includes a notification URI header field 324 in which the IP address of the SMF 202.1 is 10.193.27.145 in this example; alternative notification identifiers such as alternate IP address(es), IP address(es):port(s), or FQDN(s) within the 3GPP prescribed 'altNotifIpv4Addrs' header field 326; and a new load-sharing enabled flag or indicator header field 322, such as "load-sharing possible: 'yes'" (or any variation thereof), that can be used to indicate that load-share event notifications can be sent to the consumers/consumer instances (e.g., any of SMFs 302.1-302.4). If the flag is missing or the flag is set to "no", the alternative notification identifiers can be used by the PCF 304 as backup addresses in case a failure occurs on the primary address (as currently specified in 3GPP TS 29.508). For the present example, consider that IP addresses identified in the 'altNotifIPv4Addrs' header field 326 identify IP address 10.10.10.11 corresponding to SMF 302.2, IP address 10.10.10.12 corresponding to SMF 302.3, and IP address 10.10.10.13 corresponding to SMF 302.4.

At 312, PCF 304 responds with a HTTP/2 '201 created' response to confirm that the SM Policy Context was successfully created that includes a location header field containing the URI of the created SM Policy Context.

Based on the indication that load-sharing is enabled (loadsharing possible: 'yes') for the embodiment of FIG. 3 as indicated in the 'loadsharing possible' header field 322, the PCF 304 can load-share event notifications among consumers/consumer instances using notification identifiers such as the (primary) address identified in the notification URI header filed 324 (e.g., IP address 10.193.27.145 for SMF 302.1) and the address(es) in the 'altNotifIPv4Addrs' header field 326 (10.10.10.11, 10.10.10.12, and 10.10.10.13)

Subsequently, for example, when PCF 304 determines an event notification is to be sent, such as for an SM policy update as shown at 313, the PCF 304 can select, as shown at 314, a notification identifier from the primary and alternative IP@s (and/or IP@s:ports or FQDNs, as applicable) to which to send the event notification in order to load-share the event notification across any of the consumers/consumer instances (e.g., any of SMF 302.1-302.4).

In one example, PCF 304 may load-share event notifications across the primary and alternative notification identifiers by selecting a notification identifier to which to send a given notification in a round-robin manner. In another embodiment, PCF 304 can query an NRF (e.g., NRF 108, as shown in FIG. 1) to determine loading information among the SMFs 302.1-302.4 to determine a less-loaded SMF and a corresponding notification identifier for the SMF to which to send a given event notification. Other variations can be envisioned in order to facilitate load-sharing notifications across multiple consumers/consumer instances.

Upon selecting a corresponding notification identifier for a given consumer/consumer instance to which the send the event notification, the PCF 304 can send a POST (as shown at 316) using the selected notification identifier in which the POST includes an 'smPolicyNotification' data structure (e.g., as prescribed by 3GPP TS 29.512) that identifies one or more SM policy updates for the SMF NF set 302. For the present example, consider that PCF 304 selects (at 314) to send the event notification at 316 to SMF 202.3 at IP@:port 10.10.10.12:8090. At 318, SMF 302.3 responds with a "200; OK" response indicating a successful update to the SM policy. In some embodiments, the response may include an updated or modified list of alternative notification identifiers (IP@(s), IP@:port(s), or FQDN(s)). The information contained in the notification (e.g., SM policy updates) can be shared information with the other SMFs 302.1, 302.2, and 302.4 to maintain the same context across the SMFs.

In some embodiments, an SCP may be implemented to perform load-sharing instead of a notification producer (e.g., PCF 304). For such embodiments, the new load-sharing flag/indication along with alternative notification identifiers (IP@(s), IP@@(s):port(s), or FQDN(s), as may be applicable) can be also sent in new HTTP header(s) when an event notification occurs. In one embodiment, two new HTTP/2 headers can be utilized to carry the information in which one HTTP/2 header may include the alternate notification identifiers and another HTTP/2 header may carry the flag that enables load-sharing among the addresses (rather than just using them in failure scenarios as is currently prescribed in 3GPP standards).

For example, in at least one embodiment, a new HTTP/2 header '3gpp-Sbi-Routing-Binding-alternate-authorities' can be included in the POST sent by the notification producer (e.g., PCF 304) that contains the alternative notification identifiers (e.g., IP@s, IP@s:ports, or FQDNs, as may be applicable). The POST also includes the HTTP/2 header '3gpp-Sbi-Target-apiRoot' that identifies the (primary) notification identifier (IP@/port/FQDN) of the consumer that created the subscription (e.g., IPv4 address 10.193.27.145 for SMF 302.1 in the present example). The POST may also include a new HTTP/2 load-sharing indication header, such as a '3gpp-Sbi-Routing-Binding-alternate-authorities-loadsharing' header that may be set to '3gpp-Sbi-Routing-Binding-alternate-authorities-loadsharing: yes' to indicate that load-sharing is enabled among the primary and alternative notification identifiers. FIG. 4, below illustrates example details associated with one example SCP implementation.

It is to be understood that the names of various new headers/header fields discussed herein are provided for illustrative purposes only and are not meant to limit the broad scope of the present disclosure. Any names may be utilized for headers/header fields discussed herein and, thus, are clearly within the scope of the present disclosure.

If binding levels are involved for some embodiments, two (or more) levels can be provided with two (or more) sets of alternatives, with an indication as to whether stickiness to the main callback URI is to be maintained or not (e.g., bind to the main URI or load-share across the main and alternative URIs). In some embodiments, such different binding levels can also be added to the HTTP/2 header.

The techniques illustrated for the embodiment of FIG. 3 may also be applied to the DefaultNotificationCallback URIs for an AMF (e.g., AMF 112 as shown in FIG. 1), a CHF (e.g., CHF 106 as shown in FIG. 1), and/or a UDM entity (e.g., UDM 110 as shown in FIG. 1), each of which can be stored in a NRF (e.g., NRF 108 as shown in FIG. 1).

The techniques illustrated in FIGS. 2 and 3 may be applied to load-sharing implementations involving a proxy service/function, such as an SCP. Referring to FIG. 4, FIG. 4 is a message sequence diagram illustrating yet another call flow 400 associated with sending load-share notifications to multiple receivers, according to an example embodiment. In particular, the operations illustrated for FIG. 4 may be associated with features as discussed above for FIG. 3. However, it is to be understood that similar operations as those described for FIG. 2 may be equally applicable in an SCP implementation using similar techniques as discussed herein.

FIG. 4 includes a number of SMFs 402.1-402.4 for an SMF NF set 402, a PCF 404, and a SCP 405. For implementations involving an SCP, such as SCP 405, the producer, such as PCF 404, may not be involved in the load-sharing and/or failover operations. Rather, the SCP 405 can receive various information from the PCF via HTTP/2 headers that can be used by the SCP 405 for load-sharing and/or for performing failover operations. The SCP can remove the headers before forwarding the notifications, as shown in FIG. 4. Any of the techniques discussed for any embodiments herein can be applied to implementations involving one or more proxies between a consumer and a producer.

Similarly as noted for above for the embodiments of FIGS. 2 and 3, although the embodiment of FIG. 4 illustrates example details for notification identifiers associated with each of multiple NFs (e.g., SMFs 402.1-402.4), a particular NF/NF instance could have multiple notification identifiers associated therewith. For example, a single NF/NF instance could include different services/service instances, different virtual machines, different containers, and/or the like operating on the single NF/NF instance; each of which and/or groups/sets of which different services/service instances/ virtual machines/containers/etc. could be associated with different notification identifiers. Thus, it is to be understood that the load-share notifications discussed for the embodiment of FIG. 4 can be equally applied to implementations in which multiple notification identifiers may be associated with a single NF/NF instance.

Consider an example involving SCP 405 in which a POST from SMF 402.1, as shown at 410*a*, may be sent to the SCP 405 using the IP address of the SCP 405 (e.g., IP_SCP) and the SCP 405 can forward the POST to the PCF 404, as shown at 410*b* using the IP address of the PCF 404 (e.g., IP_PCF). For the embodiment of FIG. 4, consider that the POST includes the smPolicyContextData structure configured as shown for the embodiment of FIG. 3 that includes the 3GPP prescribed 'altNotifIpv4Addrs' header field and the new load-sharing enabled flag or indicator header field, such as "loadsharing possible: "yes" (or any variation thereof), that can be used to indicate that load-share event notifications can be sent to using any of the primary and alternative notification identifiers for the consumers/consumer instances (e.g., SMF 402.1-402.4). A "201" created response is sent as shown at 412*a* from the PCF 404 to the SCP 405, which forwards the response to SMF 402.1 as shown at 412*b*.

Subsequently, when the PCF 404 determines an event notification is to be sent, as shown at 414 (e.g., an update to the SM Policy), the PCF 404 can send a subsequent event notification via a POST as shown at 416 that includes the IP address of the SCP 405 (e.g., IP_SCP). An HTTP/2 header '3gpp-Sbi-Target-apiRoot' header 430 is included with the POST that identifies the IP address of the consumer that created the subscription (e.g., IPv4 address 10.193.27.145 for SMF 302.1). The POST can also include a new HTTP/2 header, such as a '3gpp-Sbi-Routing-Binding-alternate-authorities' header 432 that contains the alternative notification identifiers (e.g., IP@s, IP@s:ports, or FQDNs, as may be applicable). For example, the '3gpp-Sbi-Routing-Binding-alternate-authorities' header 432 shown in the example of FIG. 4 can include alternative IP addresses 10.10.10.11 (corresponding to SMF 402.2 in this example), 10.10.10.12 (corresponding to SMF 402.3 in this example), and 10.10.10.13 (corresponding to SMF 402.4 in this example). The POST may also include a new HTTP/2 load-sharing indication header, such as a '3gpp-Sbi-Routing-Binding-alternate-authorities-loadsharing' header 434. For the present example consider that the load-sharing indication header is set to '3gpp-Sbi-Routing-Binding-alternate-authorities-loadsharing: yes' to indicate that load-sharing is enabled among the primary and alternative notification identifiers.

Upon receiving the POST, the SCP 405 can parse the '3gpp-Sbi-Routing-Binding-alternate-authorities-loadsharing: yes' header 434 to identify that load sharing is enabled for the notification and can (upon determining load information, in a round-robin manner, etc.) select, as shown at 418, a notification identifier from among the primary and alternative identifiers to determine a corresponding consumer/consumer instance to which to forward the event notification. For example, consider as shown that the SCP 405 selects SMF 402.3 (at 418) and sends the POST to IP address 10.10.10.13 corresponding to SMF 402.3, as shown at 420. In some instances, the SCP 405 can also use the alternate address information contained in '3gpp-Sbi-Routing-Binding-alternate-authorities' header for failover.

At 422*a*, SMF 402.3 responds with a "200; OK" response indicating a successful update to the SM policy, which is forwarded by the SCP 405 to PCF 406, as shown at 422*b*. In some embodiments, the response may include an updated or modified list of alternative notification identifiers (IP@(s), IP@:port(s), or FQDN(s)). The information included in the notification can be shared the other SMFs 402.1, 402.2, and 402.3 to maintain the same context across the SMFs.

Figure 5:
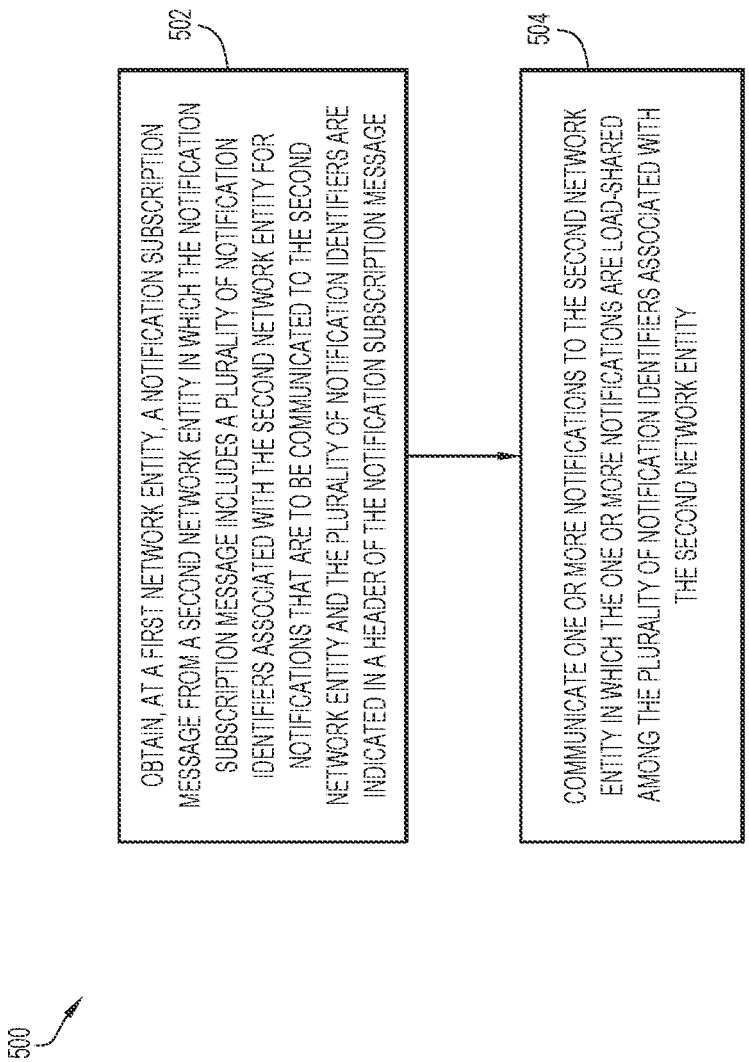
FIG. 5 is a flow chart depicting a method according to an example embodiment.

Referring to FIG. 5, FIG. 5 is a flow chart depicting a method 500 according to an example embodiment. In at least one embodiment, the method 500 may be performed, at least in part by an event notification producer, such as a PCF (e.g., any of PCF 104, 204, 304, and/or 404) for an event consumer, such as an SMF (e.g., any of SMF 102.1, 202.1, 302.1, 402.1, etc.) seeking to create a subscription for event notifications that can be load-shared across multiple notification identifiers associated with the consumer.

At 502, the method may include obtaining, at a first network entity (e.g., a PCF), a notification subscription message from a second network entity (e.g., an SMF) in which the notification subscription message includes a plurality of notification identifiers associated with the second network entity for notifications that are to be communicated to the second network entity and the plurality of notification identifiers are indicated in a header of the notification subscription message.

For example, in one embodiment the plurality of notification identifiers can include a primary and one or more active alternative notification identifiers, as discussed for FIG. 2. In another embodiment, the plurality of notification identifiers can include a primary and one or more alternative notification identifiers along with a flag that indicates that the alternative notification identifiers can be actively used for sending load-share notifications, as discussed for FIGS. 3 and 4.

At 504, the method may include communicating one or more notifications to the second network entity in which the one or more notifications are load-shared among the plurality of notification identifiers associated with the second network entity. In one instance, the second network entity may be included in a network function set comprising one or more other network entities in which the communicating may include communicating a particular notification to one of the other network entities that communicates information included in the particular notification to the second network entity (e.g., context sharing among the network entities of the network function set).

In some embodiments, the notifications can be load-shared among the plurality of notification identifiers by the first network entity (e.g., the PCF). In some embodiments, however, the notifications can be load-shared among the plurality of notification identifiers by a third network entity that may be a proxy for communications between the first network entity and the second network entity (e.g., an SCP or other proxy element).

Figure 6A:
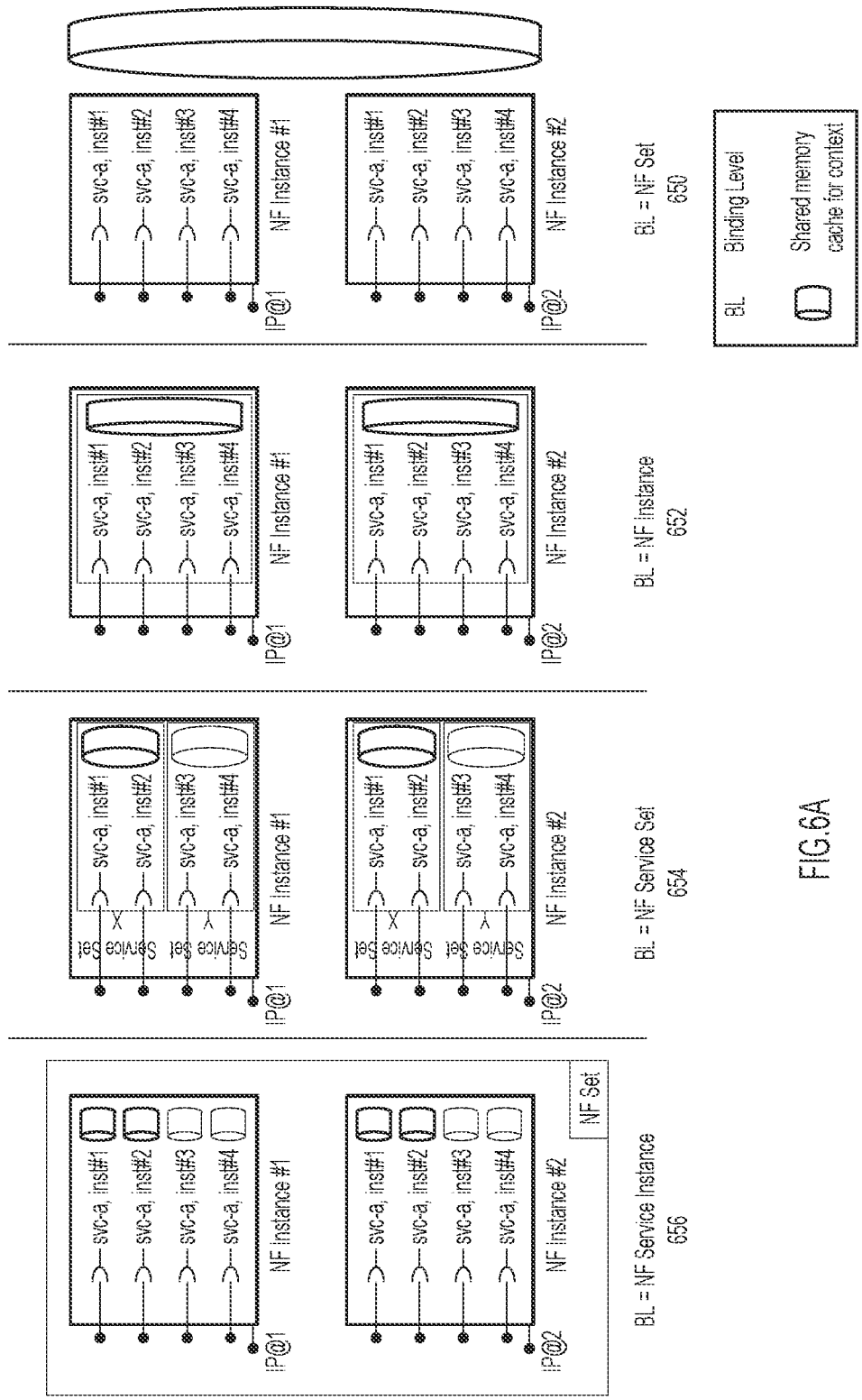
FIG. 6A is a diagram illustrating example Network Function (NF) set details, according to an example embodiment.
Figure 6B:
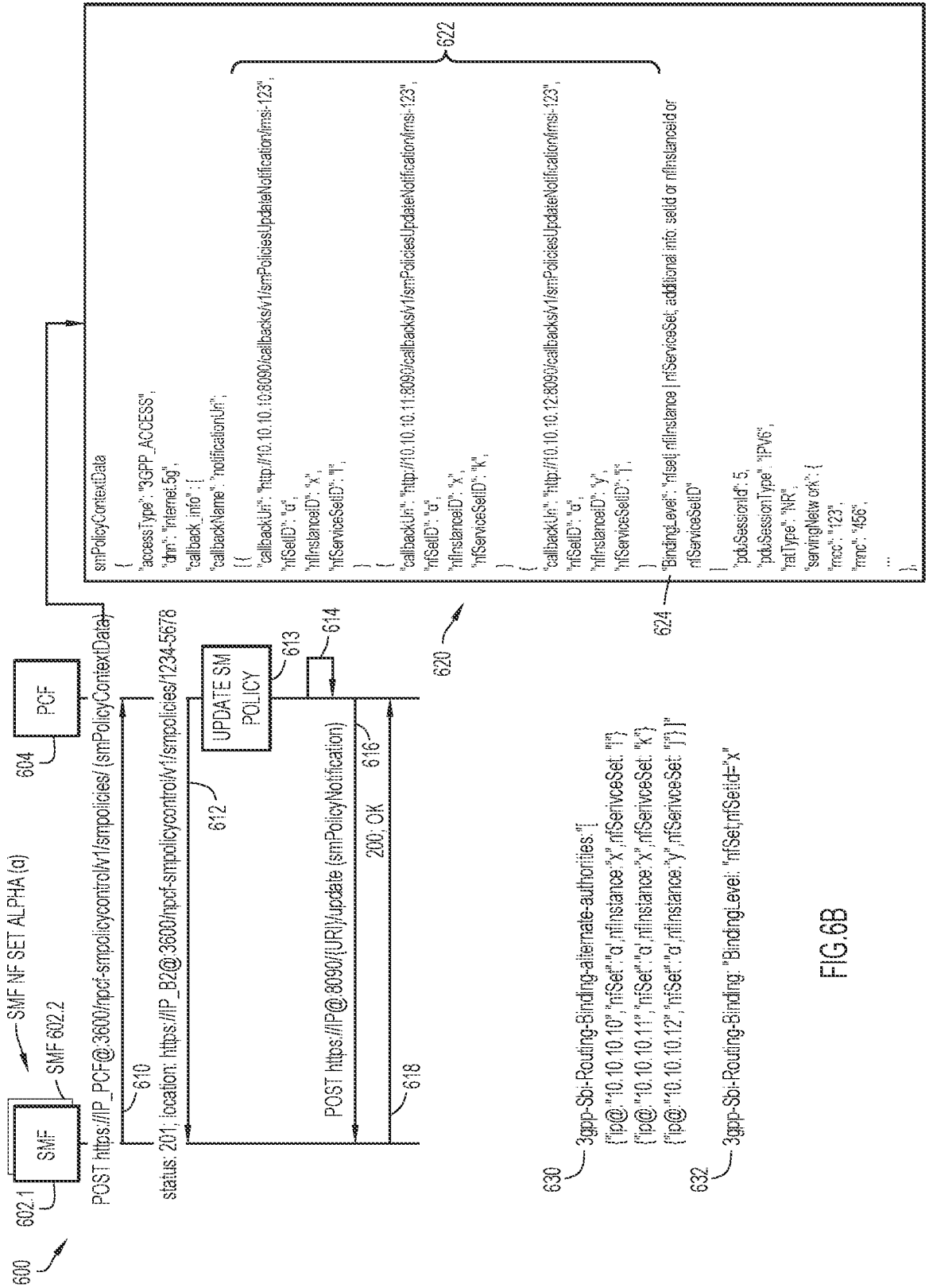
FIG. 6B is a message sequence diagram illustrating a call flow associated with sending load-share notifications to multiple receivers in connection with the NF details illustrated in FIG. 6A, according to an example embodiment.

Referring to FIGS. 6A-6B, FIGS. 6A-6B illustrate various example details that may be associated with sending load-share notifications to multiple receivers based on binding level information that may be provided in a notification subscription. FIG. 6A illustrates various example NF set details, according to an example embodiment and FIG. 6B is a message sequence diagram illustrating a call flow 600 associated with sending load-share notifications to multiple receivers based on binding level information, according to an example embodiment.

In some embodiments, techniques herein may be further enhanced such that subscription information for a number of callback URIs can include additional information such as a NF set identifier (ID), a NF instance ID, and/or NF service set ID for a corresponding URI. Further, a 'binding level'

(BL) for can be provided for the callback URIs can also be provided in the subscription to identify a 'level' of notification identifiers across which notifications can be load-shared (e.g., whether it is at an NF set level, at an NF instance level, or at a NF service set level).

Turning to FIG. 6A, various NF set and NF service set configurations are illustrated. FIG. 6A illustrates two NF instances, NF Instance #1 and NF Instance #2 in which both the NF instances belong to the same NF set. By belonging to the same NF set, context data can be shared between the NF instances. Also shown in FIG. 6A are various service instances (svc-a, inst #1; svc-a, inst #2; svc-a, inst #3; and svc-a, inst #4) that can be configured for each NF instance.

A NF can expose (as registered in the NRF), the following information:
An IP@:port at the NF instance level; and
For each service, an IP@:port. In some instances, the IP@:port at the service level can be different from each other and also different from the IP@:port at the NF instance level.

Though NF Instance #1 and NF Instance #2 can belong to the same set and share context data with each other, the concept of 'binding' has been introduced in 3GPP Rel-16 with eSBA (enhanced Service Based Architecture) whereby after initial selection of a producer service instance, subsequent transactions only occur with producer service instances that belong to a particular 'binding set'. This 'binding set' of producer service instances is a subset of all producer service instances in the NF set that share data with lower access latency, for example, in a shared memory cache. Each producer service instance is associated with a "NF service set identity" and the indication of which producer service instances belong to a 'binding set' is indicated using a 'binding level' (BL) indicator.

For example, if BL=NF set, as shown at 650, then the 'binding set' consists of all producer service instances across all NF instances in the NF set. If BL=NF instance, as shown at 652, then the 'binding set' consists of all producer service instances for a given NF instance that belong to the NF set. If BL=NF service set, as shown at 654, then the 'binding set' consists of all producer service instances that belong to a particular NF service set. For example, as shown at 654, binding could be across service instances belonging to the same NF service set spanning different NF instances. Finally, if BL=NF service instance or if a BL is not provided, as shown at 656, then the 'binding set' consists only of the initially selected producer service instance (e.g., data is not shared across producer service instances).

Consider various BL encodings, as specified in 3GPP TS 29.500, for various BL examples involving an operator whose Mobile Country Code (MCC) is 345 and Mobile Network Code (MNC) is 012, as discussed below.

Consider a first example (Example 1) involving binding to an SMF set1 of MCC 345 and MNC 012, which may be encoded as:
3gpp-Sbi-Server-Binding: bl=nfset; nfset=set1.smfset.5gc.mnc012.mcc345

Consider a second example (Example 2) involving binding to an SMF instance within the SMF set1 of Example 1, which may be encoded as:
3gpp-Sbi-Server-Binding: bl=nfinstance; nfinst=5480-4518-4191-46b3-955c-ac631f953ed8; nfset=set1.smfset.5gc.mnc012.mcc345

Consider a third example (Example 3) involving binding to a SMF Service Set "xyz" within an SMF instance within SMF set1 of Example 1, which may be encoded as:
3gpp-Sbi-Server-Binding: bl=nfserviceset; nfservset=setxyz.snnsmf-pdusession.nfi54804518-4191-46b3-955c-ac631f953ed8.5gc.mnc012.mcc345; nfset=set1.smfset.5gc.mnc012.mcc345

Consider a fourth example (Example 4) involving binding to an AMF set1 within an AMF region 48 (encoded as hexadecimal), which may be encoded as:
3gpp-Sbi-Server-Binding: bl=nfset; nfset=set1.region48.amfset.5gc.mnc012.mcc345

The concept of a 'binding set' of the producer service instances can be applied to those of consumer service instances for callback URIs in accordance with one embodiment of techniques presented herein. Call flow 600 of FIG. 6B illustrates an example embodiment involving alternative notification identifiers. FIG. 6B includes an SMF 602.1 and SMF 602.2 for an SMF NF set 'Alpha' (α) and also a PCF-1.

For each of the notification identifiers (e.g., IPv4 addresses), an SMF can provide an NF set ID (nfSetID), an NF instance ID (nfInstanceID) and an NF service set ID (nfServiceSetID). In addition, the SMF can also provide the binding level (BL) for the callback URIs. The BL can be one of three: (i) the NF set, (ii) the NF instance or (iii) the NF service set followed by additional information: (i) the NF set ID, (ii) the NF instance and NF set ID, or (iii) the NF service set, the NF instance and NF set ID, respectively. The PCF (or SCP, if implemented) can perform load-sharing across notification identifiers according to BL information provided.

Consider various examples involving SMF 602.1 and SMF 602.2 in the same SMF NF Set ID=α, as shown in FIG. 6B. If binding beyond the NF Instance is to be utilized, the SMF-A is to provide IP@ and callback-set information of callbacks in SMF 602.2. For IP@ and callback-set information beyond the current NF instance, either (a) the information about IP@ and callback set information can be configured by Operations, Administration, and Maintenance (OAM) entities or (b) the IP@ and callback-set information can be generated algorithmically by the NF instance (e.g., the IP@ of the other SMF 602.2 instance+1:4, for 4 callbacks in SMF 602.2 in which callback-set=x for 1:2 and callback-set=y for 3:4, where the callback set values x and y can be the same as that configured on the current NF set).

For the embodiment as illustrated in FIG. 6B, SMF 602.1 can send a POST at 610 that includes callback-set information 622 and binding level information for a 'BindingLevel' header field 624 configured for an smPolicyContextData data structure 620. Other operations 612 for sending a response and 613 for determining an SM policy update can be performed as discussed for other examples herein. At 614 and 616, the PCF 604 can load-share a notification communication by selecting a notification identifier based on the BL provided in the binding level header 624 of the POST received at 610. For example, if the BL as set to nfSetID='α' and nfInstanceID='x' then the PCF may load-share the notification across IP addresses 10.10.10.10 and 10.10.10.11 according to the BL.

For implementations involving an SCP or other intermediate proxies, a '3g-Sbi-Routing-Binding-alternate-authorities' HTTP/2 header 630 can be enhanced to include additional information from the subscription data to provide nfset, nfInstance and nfServiceSet information in the new header that can be included in a POST sent from the PCF. A '3gpp-SBI-Routing-binding' HTTP/2 header 632 can be reused to provide binding level information (e.g., level of binding and identifier associated with the level) for the POST sent from the PCF. These headers can also be used by intermediate proxies (e.g., an SCP, etc.) to perform loadsharing for event notifications using similar operations as discussed for other examples provided herein.

Figure 7:
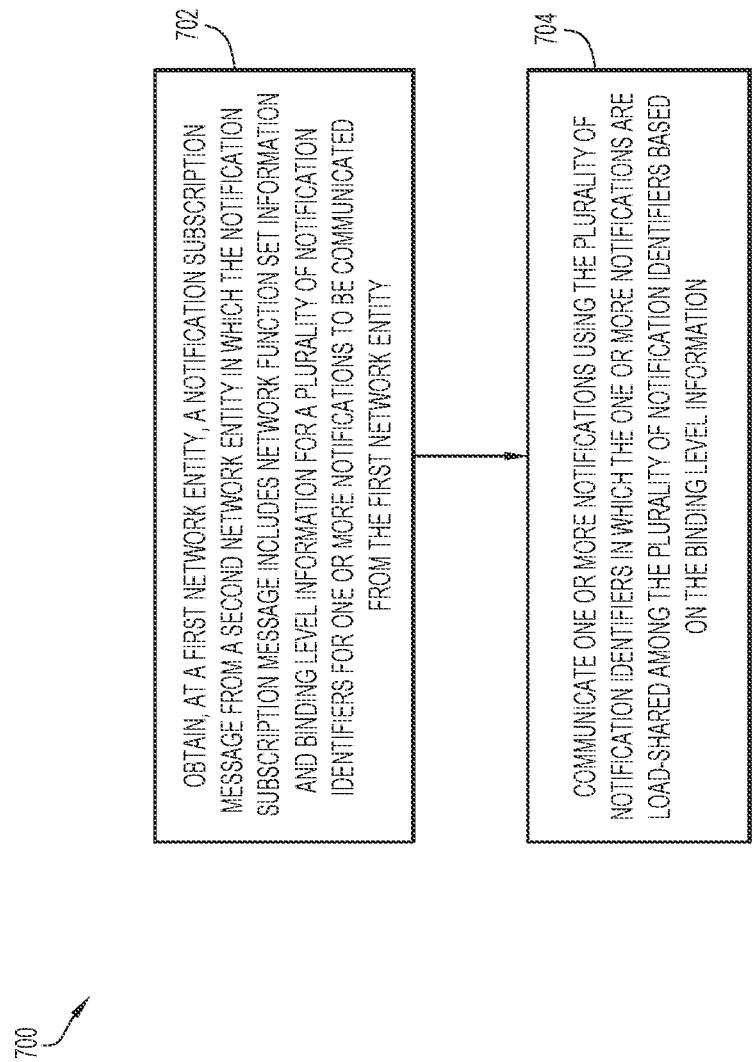
FIG. 7 is a flow chart depicting another method according to an example embodiment.

Referring to FIG. 7, FIG. 7 is a flow chart depicting another method 700 according to an example embodiment. In at least one embodiment, the method 700 may be performed, at least in part by an event notification producer, such as the PCF 604 of FIG. 6B, for an event consumer, such as the SMF 602.1 or 602.2 of FIG. 6B, seeking to create a subscription for event notifications that can be load-shared across multiple notification identifiers associated with the consumer.

At 702, the method may include obtaining, at a first network entity (e.g., PCF 604), a notification subscription message from a second network entity (e.g., SMF 602.1) in which the notification subscription message includes network function set information and binding level information for a plurality of notification identifiers for one or more notifications to be communicated from the first network entity.

At 704, the method includes communicating one or more notifications using the plurality of notification identifiers in which the one or more notifications are load-shared among the plurality of notification identifiers based on the binding level information.

In summary, provided herein are techniques that enable notifications to be sent to multiple consumers, hence making eSBA applicable to all services of a 5GC/5GS network, thereby providing an important feature for 5G architectures.

Figure 8:
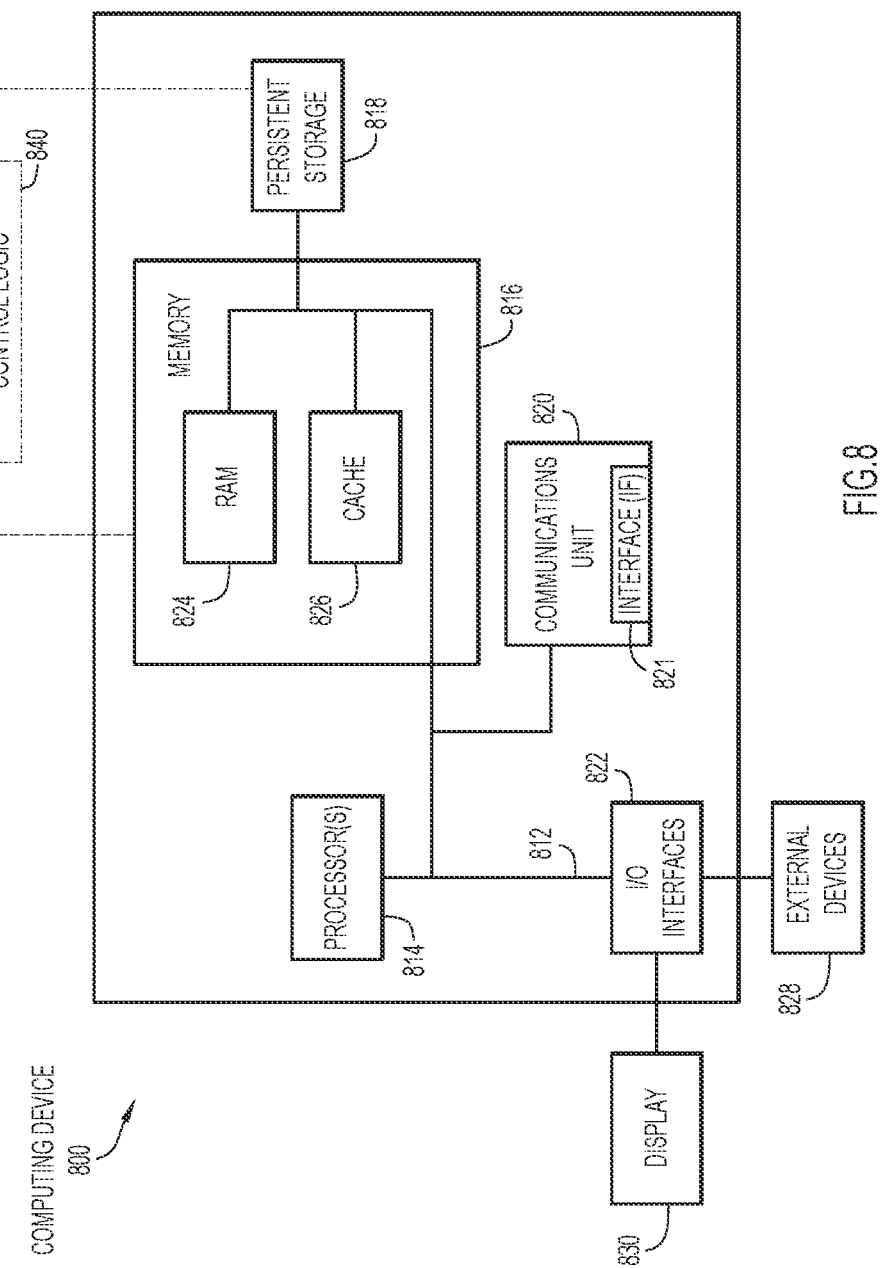
FIG. 8 is a hardware block diagram of a computing device that may perform functions associated with any combination of operations in connection with techniques discussed herein.

Referring to FIG. 8, FIG. 8 illustrates a hardware block diagram of a computing device 800 that may perform functions associated operations discussed herein in connection with the techniques presented herein. In various embodiments, a computing device, such as computing device 800 or any combination of computing devices 800, may be configured as any elements/devices/nodes, such as an event producer (e.g., a PCF, etc.), an event consumer/receiver (e.g., an SMF, etc.), a proxy entity (e.g., an SCP), and/or any other entity as discussed for the techniques presented herein.

It should be appreciated that FIG. 8 provides only an illustration of one embodiment and does not imply any limitations with regard to the environments in which different embodiments may be implemented. Many modifications to the depicted environment may be made.

As depicted, the computing device 800 includes a bus 812, which provides communications between computer processor(s) 814, memory 816, persistent storage 818, at least one communications unit 820, and input/output (I/O) interface(s) 422. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media, which can be inclusive on non-transitory computer readable storage media. In the depicted embodiment, memory 816, which may be inclusive of one or more memory element(s), includes random access memory (RAM) 824 and cache memory 826. In general, memory 816 can include any suitable volatile or non-volatile computer readable storage media. Instructions for control logic 840 may be stored in memory 816 and/or persistent storage 818 for execution by processor(s) 814.

When the processor(s) 814 execute control logic 840 are caused to perform the operations described above in connection techniques discussed herein. For example, if the computing device is configured as a PCF or an SCP, executing the control logic 840 may cause the processor(s) to perform operations such as, for example, obtaining a notification subscription message from a second network entity in which the notification subscription message includes a plurality of notification identifiers associated with the second network entity for one or more notifications to be communicated to the second network entity and in which the plurality of notification identifiers are indicated, at least in part, in a header of the notification subscription message; and communicating one or more notifications to the second network entity in which the one or more notifications are load-shared among the plurality of notification identifiers associated with the second network entity. Other operations can be performed in accordance with other techniques as discussed for various embodiments described herein.

One or more programs and/or other logic may be stored in persistent storage 818 for execution by one or more of the respective computer processors 814 via one or more memory element(s) of memory 816. The persistent storage 818 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems, networks, and/or devices. In these examples, each communications unit 820 may include at least one interface (IF) 821, which may facilitate communications with systems, networks, and/or devices utilizing any combination of hardware, software, etc. to facilitate one or more connections for communications discussed herein. Accordingly, communications unit 820 may provide communications through the use of any combination of physical and/or wireless communications links.

I/O interface(s) 822 allow for input and output of data with other devices that may be connected to computing device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

In one form, a computer-implemented method is provided that may include obtaining, at a first network entity, a notification subscription message from a second network entity, the notification subscription message comprising a plurality of notification identifiers associated with the second network entity for notifications that are to be communicated to the second network entity, wherein the plurality of notification identifiers are indicated, at least in part, in a header of the notification subscription message; and communicating one or more notifications to the second network entity, wherein the one or more notifications are load-shared among the plurality of notification identifiers associated with the second network entity.

In at least one instance, the second network entity may be included in a network function set comprising one or more other network entities and the plurality of notification identifiers are associated with the second network entity and the one or more other network entities of the network function set, and wherein the communicating includes communicating a particular notification to one of the other network entities in which the particular notification is shared with the second network entity.

In at least one instance, the plurality of notification identifiers may be associated with one or more of: a plurality of services or service instances operating on the second network entity; a plurality of virtual machines operating on the second network entity; and a plurality of containers operating on the second network entity.

In various instances, the plurality of notification identifiers may include at least one of: a plurality of Internet Protocol (IP) addresses associated with the second network entity to which the one or more notifications can be communicated; a plurality of port numbers associated with the second network entity to which the one or more notifications can be communicated; and a plurality of Fully Qualified Domain Names (FQDNs) associated with the second network entity to which the one or more notifications can be communicated.

In at least one instance, the notification subscription message may be a request for the first network entity to create a policy associated with the second network entity and the header of the notification subscription message including the plurality of notification identifiers is an Hypertext Transfer Protocol (HTTP) header. In at least one instance, the HTTP header may include a notification Uniform Resource Identifier (URI) field comprising a first notification identifier of the plurality of notification identifiers; and a header field comprising a remainder of the plurality of notification identifiers. In at least one instance the HTTP header may further include another header field including an indication that the one or more notifications are to be load-shared among the plurality of notification identifiers.

In at least one instance, the first network entity may be one of a Third Generation Partnership Project (3GPP) Policy Control Function (PCF), a Charging Function (CHF), or a Unified Data Management (UDM) entity and the second network entity may be one of a 3GPP Session Management Function (SMF) or an Access and Mobility Management Function (AMF).

In at least one instance, the one or more notifications can be load-shared among the plurality of notification identifiers by the first network entity. In at least one instance, the one or more notifications can be load-shared among the plurality of notification identifiers by a third network entity that is a proxy for communications between the first network entity and the second network entity.

In various instances, the one or more notifications may include at least one of: one or more headers indicating the plurality of notification identifiers associated with the second network entity; and a header indicating that the one or more notifications are to be load shared among the plurality of notification identifiers associated with the second network entity.

In at least one instance, the method may further include selecting a particular notification identifier to which to send a particular notification based on one of: loading information associated with the plurality of notification identifiers; and a pre-determined selection order associated with the plurality of notification identifiers.

In one form another computer-implemented method is provided that may include obtaining, at a first network entity, a notification subscription message from a second network entity, wherein the notification subscription message comprises network function set information and binding level information, and wherein the network function set information comprises a plurality of notification identifiers for one or more notifications to be communicated; and communicating one or more notifications using the plurality of notification identifiers, wherein the one or more notifications are load-shared among the plurality of notification identifiers based on the binding level information.

The binding level information may identify a binding level corresponding to one of: a network function set binding level; a network function instance binding level; and a network function service set binding level. In various instances, the plurality of notification identifiers comprise at least one of: a plurality of Internet Protocol (IP) addresses associated with the second network entity to which the one or more notifications can be communicated; a plurality of port numbers associated with the second network entity to which the one or more notifications can be communicated; and a plurality of Fully Qualified Domain Names (FQDNs) associated with the second network entity to which the one or more notifications can be communicated.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein (e.g., context shared between consumers/consumer instances, etc.) may be stored within any conventional or other data structures (e.g., files, arrays, lists, stacks, queues, records, etc.) and may be stored in any desired storage unit (e.g., database, data or other repositories, queue, etc.). The data or information transmitted and/or shared between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores, or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, at a first network entity, a notification subscription message from a second network entity, the notification subscription message comprising a plurality of notification identifiers associated with the second network entity for notifications that are to be communicated to the second network entity, wherein the plurality of notification identifiers are indicated, at least in part, in a header of the notification subscription message; and
communicating one or more notifications to the second network entity, wherein the one or more notifications are load-shared among the plurality of notification identifiers associated with the second network entity.

2. The method of claim 1, wherein the second network entity is included in a network function set comprising one or more other network entities and the plurality of notification identifiers are associated with the second network entity and the one or more other network entities of the network function set, and wherein the communicating includes communicating a particular notification to one of the other network entities in which the particular notification is shared with the second network entity.

3. The method of claim 1, wherein the plurality of notification identifiers are associated with one or more of: a plurality of services or service instances operating on the second network entity; a plurality of virtual machines operating on the second network entity; and a plurality of containers operating on the second network entity.

4. The method of claim 1, wherein the plurality of notification identifiers comprise at least one of:
a plurality of Internet Protocol (IP) addresses associated with the second network entity to which the one or more notifications can be communicated;
a plurality of port numbers associated with the second network entity to which the one or more notifications can be communicated; and
a plurality of Fully Qualified Domain Names (FQDNs) associated with the second network entity to which the one or more notifications can be communicated.

5. The method of claim 1, wherein the notification subscription message is a request for the first network entity to create a policy associated with the second network entity and the header of the notification subscription message including the plurality of notification identifiers is an Hypertext Transfer Protocol (HTTP) header.

6. The method of claim 5, wherein the HTTP header comprises:
a notification Uniform Resource Identifier (URI) field comprising a first notification identifier of the plurality of notification identifiers; and
a header field comprising a remainder of the plurality of notification identifiers.

7. The method of claim 6, wherein the HTTP header further comprises another header field including an indication that the one or more notifications are to be load-shared among the plurality of notification identifiers.

8. The method of claim 1, wherein the first network entity is one of a Third Generation Partnership Project (3GPP) Policy Control Function (PCF), a Charging Function (CHF), or a Unified Data Management (UDM) entity and the second network entity is one of a 3GPP Session Management Function (SMF) or an Access and Mobility Management Function (AMF).

9. The method of claim 1, wherein the one or more notifications are load-shared among the plurality of notification identifiers by the first network entity.

10. The method of claim 1, wherein the one or more notifications are load-shared among the plurality of notification identifiers by a third network entity that is a proxy for communications between the first network entity and the second network entity.

11. The method of claim 10, wherein the one or more notifications comprise at least one of:
one or more headers indicating the plurality of notification identifiers associated with the second network entity; and
a header indicating that the one or more notifications are to be load shared among the plurality of notification identifiers associated with the second network entity.

12. The method of claim 1, further comprising:
selecting a particular notification identifier to which to send a particular notification based on one of:
loading information associated with the plurality of notification identifiers; and
a pre-determined selection order associated with the plurality of notification identifiers.

13. A method comprising:
obtaining, at a first network entity, a notification subscription message from a second network entity, wherein the notification subscription message comprises network function set information and binding level information, and wherein the network function set information comprises a plurality of notification identifiers for one or more notifications to be communicated; and
communicating one or more notifications using the plurality of notification identifiers, wherein the one or more notifications are load-shared among the plurality of notification identifiers based on the binding level information.

14. The method of claim 13, wherein the binding level information identifies a binding level corresponding to one of:
a network function set binding level;
a network function instance binding level; and
a network function service set binding level.

15. The method of claim 13, wherein the plurality of notification identifiers comprise at least one of:
a plurality of Internet Protocol (IP) addresses associated with the second network entity to which the one or more notifications can be communicated;
a plurality of port numbers associated with the second network entity to which the one or more notifications can be communicated; and
a plurality of Fully Qualified Domain Names (FQDNs) associated with the second network entity to which the one or more notifications can be communicated.

16. One or more non-transitory computer readable storage media encoded with instructions that, when executed by a processor, cause the processor to perform operations, comprising:
obtaining, at a first network entity, a notification subscription message from a second network entity, the notification subscription message comprising a plurality of notification identifiers associated with the second network entity for notifications that are to be communicated to the second network entity, wherein the plurality of notification identifiers are indicated, at least in part, in a header of the notification subscription message; and communicating one or more notifications to the second network entity, wherein the one or more notifications are load-shared among the plurality of notification identifiers associated with the second network entity.

17. The media of claim 16, wherein the second network entity is included in a network function set comprising one or more other network entities and the plurality of notification identifiers are associated with the second network entity and the one or more other network entities of the network function set, and wherein the communicating includes communicating a particular notification to one of the other network entities in which the particular notification is shared with the second network entity.

18. The media of claim 16, wherein the plurality of notification identifiers are associated with one or more of: a plurality of services or service instances operating on the second network entity; a plurality of virtual machines operating on the second network entity; and a plurality of containers operating on the second network entity.

19. The media of claim 16, wherein the notification subscription message is a request for the first network entity to create a policy associated with the second network entity and the header of the notification subscription message including the plurality of notification identifiers is an Hypertext Transfer Protocol (HTTP) header comprising:

a notification Uniform Resource Identifier (URI) field comprising a first notification identifier of the plurality of notification identifiers;

a header field comprising a remainder of the plurality of notification identifiers; and an indication that the one or more notifications are to be load-shared among the plurality of notification identifiers.

20. The media of claim 16, wherein the one or more notifications comprise at least one of:

one or more headers indicating the plurality of notification identifiers associated with the second network entity; and a header indicating that the one or more notifications are to be load shared among the plurality of notification identifiers associated with the second network entity.

\* \* \* \* \*